H. N. KENNEDY.
DRILL CHUCK.
APPLICATION FILED MAR. 27, 1909.

938,589.

Patented Nov. 2, 1909.

Witnesses:
W. E. Smith
H. F. Griffin

Figures 4, 5:
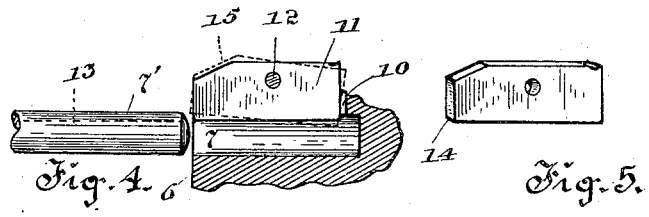
Figure 6:
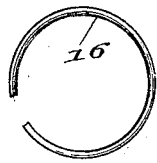
Figure 7:

Inventor:
Herman N. Kennedy,
by Joshua R. H. Potts
his Attorney.

jaw and the shank of a drill, Fig. 5 is a detail perspective view showing the drill jaw, and Figs. 6 and 7 are detail elevations.

UNITED STATES PATENT OFFICE.

HERMAN N. KENNEDY, OF CHICAGO, ILLINOIS.

DRILL-CHUCK.

938,589.  Specification of Letters Patent.  Patented Nov. 2, 1909.

Application filed March 27, 1909. Serial No. 486,242.

*To all whom it may concern:*

Be it known that I, HERMAN N. KENNEDY, a citizen of the United States, residing at Chicago, county of Cook, and State of Illinois, have invented certain new and useful Improvements in Drill-Chucks, of which the following is a specification.

My invention relates to improvements in drill chucks, the object of the invention being to provide an improved drill chuck which will be easily operated and so constructed as to hold drills securely and in axial alinement therewith.

A further object of my invention is to provide simple means whereby a drill may be quickly inserted and removed from the chuck.

A further object is to provide a pivoted jaw in the chuck adapted to be held by a spring in such a normal position that a drill may readily enter the chuck.

Other objects will appear hereinafter.

With these objects in view my invention consists in the novel construction and arrangement of parts as will be hereinafter fully described and particularly pointed out in the appended claims.

Figure 1:
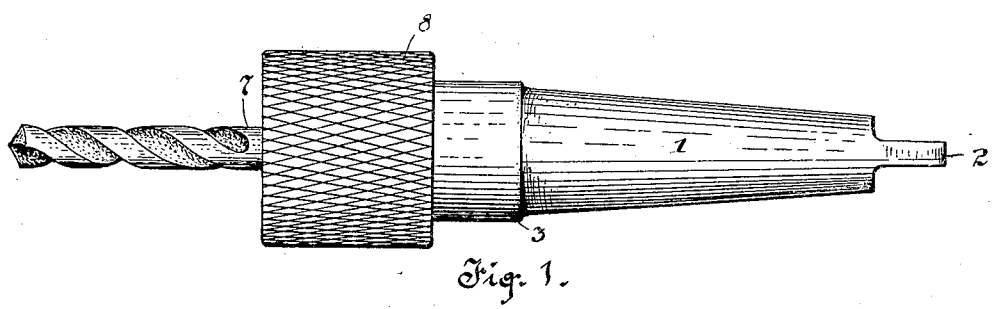
Figures 2, 3:
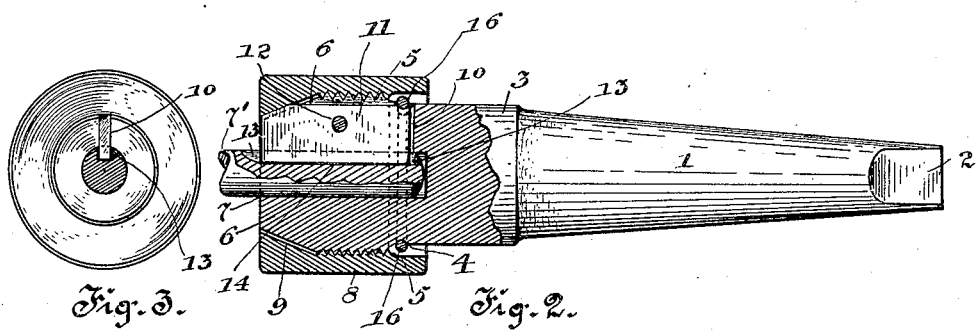

My invention will be more readily understood by reference to the accompanying drawings forming a part of this specification, and in which, Figure 1 is a side elevation of my improved drill chuck in its preferred form, Fig. 2 is substantially a central vertical longitudinal section showing a portion in elevation taken at right angles to that of Fig. 1, Fig. 3 is an end elevation, Fig. 4 is a detail fragmentary view showing the chuck drill jaw and the shank of a drill, Fig. 5 is a detail perspective view showing the drill jaw, and Figs. 6 and 7 are detail elevations.

Referring now to the drawings 1 designates the tapering shank of the chuck and 2 a tang formed in the end thereof. The head of the chuck is integral with the shank 1 and comprises a cylindrical portion 3 having a circumferential groove 4 formed therein, a threaded portion 5 adjacent said groove, and a tapered end portion 6 having a central longitudinal bore 7 of a sufficient size to admit freely the shank of the drill 7'. A knurled cylindrical cap 8 is threaded to receive the threaded portion 5 of the chuck head, the internal taper 9 in said cap being disposed at the same angle as the tapered portion 6 of said head. A longitudinal slot 10 extending radially from the bore 7 is provided in the chuck head, and a jaw 11 is mounted in said slot and adapted to oscillate on the transversely disposed pivotal pin 12 secured in said head. A longitudinal groove 13 with a bottom substantially parallel with its axis is provided in the shank of the drill 7', and the lower surface 14 of the jaw 11 is adapted to contact with the bottom of the groove 13 when the drill is in position in the bore 7. Before the drill 7' is inserted in the bore 7 the jaw 11 is held in normal or dotted line position, as shown in Fig. 4, by means of a substantially circular wire spring 16 seating in the circumferential groove 4 and pressing inwardly on the inner end of said jaw. One corner of the jaw 11 is cut away and inclined to conform to the internal taper 9 of the cap 8 in such a manner as to be forced against the bottom of the groove 13 of the drill 7' when the cap 8 is screwed onto the chuck head, thus securing the drill in position.

It will be seen that the jaw 11 is in a favorable position to receive the drill before the same is inserted in the chuck, and that after insertion the jaw contacts not only with the bottom but with the sides of the drill groove, the side contact forming a positive means for rotating the drill.

It will be observed that the slot 10 and jaw 11 extend to the end of the head where they are visible and that the spring 16 holds the jaw in a tilted position, thus facilitating insertion of the drill. Owing to the fact that the bottom of the groove in the drill is substantially parallel to its axis and the jaw 11 contacts therewith for its entire length the drill will be nicely held in position and all tendency to tilt avoided.

An important feature of the chuck is that it may be operated with facility and ease, it requiring but a slight turn of the cap to tighten or loosen a drill.

While I have shown what I deem to be the preferable form of my improved drill chuck, I do not wish to be limited thereto as there might be slight modifications thereof which would be comprehended within the scope of my invention.

Having described my invention what I claim as new and desire to secure by Letters Patent is:

1. The combination with a drill having a longitudinal groove in its shank extending to the edge of said shank, of a chuck comprising a threaded head provided with a tapered end and a central bore and radial slot extending to the end of said head; a threaded cap taking over said head and provided with an internal taper corresponding to the taper of the end of said head; and a clamping jaw pivoted in said slot and having its inner edge projecting into said central bore and adapted to contact with the bottom of said groove for its entire length, the said jaw having a tapered end projecting slightly from its slot and adapted to contact with the internal taper on said cap; and a spring for tilting the outer end of said jaw outwardly, substantially as described.

2. The combination with a drill having a drill 7' provided with a groove 13 extending to the edge of said drill shank and having its bottom substantially parallel with the axis of said drill, of a chuck comprising a threaded head portion 3 and a tapered end portion 6 and provided with a central bore 7 and radial slot 10 extending to the end of said chuck head; and a threaded cap 8 taking over head portion 3 and provided with the internal taper 9 corresponding to the tapered end portion 6; a clamping jaw 11 pivoted in slot 10 and having its inner edge projecting into bore 7 and adapted to contact with the bottom of groove 13 for its entire length, the said jaw having a tapered end projecting slightly from its slot and adapted to contact with the internal taper on said cap; and a circumferential wire spring 16 seated in a groove in the head 3 and pressing inwardly on the inner end of jaw 11, substantially as described.

In testimony whereof I have signed my name to this specification in the presence of two subscribing witnesses.

HERMAN N. KENNEDY.

Witnesses:
  JOSHUA R. H. POTTS,
  HELEN F. LILLIS.